United States Patent
Hamana et al.

(10) Patent No.: US 7,833,432 B2
(45) Date of Patent: Nov. 16, 2010

(54) COMPOSITE METAL MOLDING AND METHOD FOR MANUFACTURING THEREOF

(75) Inventors: Junji Hamana, Hannou (JP); Isamu Kawada, Hannou (JP); Naoaki Maruyama, Chichibu (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 677 days.

(21) Appl. No.: 11/548,165

(22) Filed: Oct. 10, 2006

(65) Prior Publication Data
US 2007/0149681 A1    Jun. 28, 2007

(30) Foreign Application Priority Data
Oct. 11, 2005  (JP)  ............................. 2005-296480
Sep. 25, 2006  (JP)  ............................. 2006-259246

(51) Int. Cl.
*C04B 35/04*   (2006.01)
*H01F 1/26*    (2006.01)

(52) U.S. Cl. .................... 252/62.54; 335/297; 148/316; 148/319; 75/236

(58) Field of Classification Search ......... 335/296–306; 252/62.53–62.54; 148/278, 316–319; 75/236–243
See application file for complete search history.

(56) References Cited

U.S. PATENT DOCUMENTS 5,238,507 A  *  8/1993  Kugimiya et al.  ........... 148/307
5,284,615 A  *  2/1994  Ueda et al.  .................... 419/37
6,248,691 B1 *  6/2001  Gadkaree et al.  ............ 502/423
6,623,542 B2 *  9/2003  Yamashita et al.  ............ 75/243
6,872,325 B2 *  3/2005  Bandyopadhyay et al.  ........................ 252/62.54

FOREIGN PATENT DOCUMENTS

JP     6-17103     1/1994
JP     7-176416    7/1995
JP     8-293411    11/1996

OTHER PUBLICATIONS

People's Republic of China Notification of First Office Action concerning application No. 2006101423827 with English translation of text portion dated Jun. 13, 2008.

* cited by examiner

*Primary Examiner*—Ramon M Barrera
(74) *Attorney, Agent, or Firm*—Canon U.S.A., Inc. I.P. Division

(57) ABSTRACT

A compression molding which is high in both dimensional accuracy and mechanical strength is difficult to manufacture by a powder molding process. Especially, a molding including a soft magnetic material with high soft magnetic properties is difficult to manufacture. A composite metal molding according to the present invention includes metal particles and the carbide of a resin intervening among the particles. It is manufactured by coating metal particles with a resin, molding the prepared molding material under pressure into a predetermined shape, and heating the prepared pressurized preform to calcine the resin and weld mutually the particles. The carbide of the resin has a weight ratio of 0.001 to 2% to the metal particles when the particles have their proportion expressed as 100. The particles have a weld ratio of 10 to 80%. The particles preferably contain a soft magnetic material and the resin is preferably a furan resin.

3 Claims, 11 Drawing Sheets

WELDED PORTION OF METAL PARTICLES

ANTI-WELDING PORTION (VOID)

RESIN CARBIDE

COMPOSITE METAL MOLDING AND METHOD FOR MANUFACTURING THEREOF

BACKGROUND OF THE INVENTION

1. Field of the Invention

The present invention relates to a composite metal molding including metal particles which welded mutually and resin carbide intervening among the metal particles, a method for manufacturing the composite metal molding and an electromagnetic driving element having a yoke forming a magnetic circuit upon energization to a field coil.

2. Description of the Related Art

There is known a powder molding process in which metal particles are compression molded in a mold with a resin used as a bonding material. A molding made by the powder molding process has the advantage of being very close in dimensions and shape to the mold and basically not requiring any post-work. Accordingly, the powder molding process can be said to be a process which is effective for manufacturing mainly a product of an expensive material or a product which is difficult to make by cutting work. The molding made by the powder molding process is limited in mechanical strength because of its structure including a resin as a bonding material among metal particles. Accordingly, the molding made by the powder molding process is often used as an element for which mechanical strength is not very important. For example, a molded magnetic member made by employing a rare earth magnet powder as metal particles is adopted as e.g. a circular columnar rotor in a motor. The scope of its application is further expanded to include e.g. the yoke or stator of a motor, the yoke or transformer of an actuator in an optical instrument and the core of a magnetic head which are all made by employing a soft magnetic material as metal particles.

In order to improve the magnetic properties of a magnetic member molded by employing a hard magnetic material as metal particles, it is effective to apply as high a molding pressure as possible to bring the metal particles close together to realize a high magnetic flux density. It is also effective to heat a compression molding to harden the resin among metal particles and then return the resin to ambient temperature to make it undergo thermal contraction, as disclosed in Japanese Patent Application Laid-open No. 7-176416 (1995). This makes it possible to bring the particles closer together and raise their coercive force owing to their thermal contraction strain to achieve an improved maximum energy product.

There is also known a product made by heating a compression molding extremely to weld metal particles together, while removing a bonding material completely in a degreasing step as according to a powder metallurgical sintering process, and thereafter sizing it to finish it into a desired size and shape. However, a molded magnetic body made by employing metal particles which are greatly affected by stress strain, such as a soft magnetic material, has its soft magnetic properties lowered by processing strain resulting from post-processing, such as sizing. It has also been likely that a molded magnetic body having an asymmetric complicated shape may not permit any such sizing. In order to overcome these inconveniences, Japanese Patent Application Laid-open No. 6-017103 (1994) proposes a method in which a sintered product is manufactured accurately by inserting a correcting member in a hollow compact and placing the compact on a plate having a protruding or recessed mark to support it in its end surface.

The epoxy resin which is usually employed as a bonding material for a bonded magnet can withstand a temperature of only, say, 300° C., and cannot withstand the temperature for the stress-relief annealing of a soft magnetic material which may be as high as about 1,000° C. Any attempt to heat for stress relieving a molded magnetic body made by bonding a soft magnetic material with an epoxy resin causes the epoxy resin to foam or disappear and lowers its strength and dimensional accuracy seriously. It will be possible to use water glass or a silicone resin as a bonding material having higher heat resistance than the epoxy resin, but as they have only a very low force for bonding metal particles, a large amount of bonding material is required for producing a desired bonding force. Moreover, the use of a large amount of bonding material forms an enlarged clearance among metal particles making it impossible to realize a high magnetic flux density, and resulting in a molded magnetic body of low magnetic properties.

In order to raise the mechanical strength of a compression molding made by powder molding, it is effective to raise the density of its material and it is, therefore, necessary to employ a higher molding pressure. However, if the compression molding of a material having its magnetic properties lowered by stress and strain, such as a soft magnetic material, employs an increased molding pressure to raise its soft magnetic properties, the stress and strain bearing on the soft magnetic material itself increase and thereby lower its soft magnetic properties.

While it is possible to form an irregularly shaped member by the electrical discharge machining or wire-cut electrical discharge machining of a metallic material, it is too low in mass productivity for practical use. While it is also possible to form an irregularly shaped member by a powder metallurgical method, the scattering of a bonding material during sintering or the welding of particles causes so large a dimensional change in a sintered product that a long time is required for its post treatment. Even if a product of a soft magnetic material may allow sizing for its shape correction, its processing strain lowers its soft magnetic properties seriously.

SUMMARY OF THE INVENTION

It is an object of the present invention to provide a composite metal molding containing a soft magnetic material and having good dimensional accuracy and mechanical strength and a method for manufacturing the composite metal molding. It is one of the other objects of the present invention to provide an electromagnetic drive element being able to employ the composite metal molding as a yoke for a motor using a moving magnet.

A first aspect of the present invention is concerned with a composite metal molding including metal particles which welded mutually and resin carbide intervening among the metal particles, the metal particle containing a soft magnetic material.

In the present invention, a furan resin is preferably used as a bonding material for metal particles, since when a pressurized preform is heated, the furan resin is not burned away completely, but remains to an adequate extent enabling the molding to avoid any large dimensional change as any molding of the powder metallurgical sintering process makes. When the pressurized preform is heated, the metal particles are welded mutually to an adequate extent enabling a composite metal molding of improved mechanical strength to be manufactured.

According to the composite metal molding of the present invention, the molding made by heating a pressurized preform hardly differs in dimensions or shape from the pressurized preform, but provides a molding of high dimensional accuracy not calling for any post working, but having good soft magnetic properties. This is due to the presence of resin carbide among the metal particles welded together.

In the composite metal molding according to the first aspect of the present invention, the resin carbide preferably have a weight ratio in the range of 0.001 to 2% to the metal particles when the metal particles have their proportion expressed as 100. Its weight ratio is more preferably in the range of 0.003 to 1.5% and most preferably in the range of 0.005 to 1.0%. If the weight ratio of the resin carbide to the metal particles exceeds 2%, the molding is of lower density and mechanical strength and is of lower dimensional accuracy due to an increase of carbonized resin and the gas gathering in the molding. It is of lower dimensional accuracy when the ratio is lower than 0.001%, too. The weight ratio of the resin carbide to the metal particles can be determined by infrared absorption spectroscopy after combustion. Basically, an increase in the weight ratio of the carbide brings about a lowering in the density and mechanical strength of the composite metal molding. On the other hand, a decrease in the weight ratio of the carbide brings about a lowering in the dimensional accuracy of the molding. However, too high a weight ratio of the carbide also brings about a lower dimensional accuracy due to an increase of carbonized resin and the gas gathering in the molding.

The metal particles containing a soft magnetic material preferably have a weld ratio in the range of 10 to 80% and more preferably in the range of 15 to 75%. A weld ratio exceeding 80% results in a molding of low dimensional accuracy. On the other hand, a weld ratio which is lower than 10% results in a molding of low mechanical strength. It also fails to show good magnetic properties. The weld ratio R of the metal particles is determined by grinding the surface of the composite metal molding and measuring the total outer circumferential length L of the metal particles exposed in its surface and the length C of the welded portion and is expressed as $R=(2C/L) \times 100$.

The weight ratio of the resin carbide set in the range of 0.001 to 2% to the metal particles taken to be 100 and the weld ratio of the metal particles set in the range of 10 to 80% ensure the manufacture of a composite metal molding of high dimensional accuracy. Moreover, the molding is high in mechanical strength and excellent in mass productivity.

Another simple method of determining the weld ratio is based on the fact that a higher weld degree of metal particles in a composite metal molding results in a lower resistance thereof, and the weld ratio is determined by measuring the volume resistance of a bulk formed from the same metal as a composite metal molding, dividing it by the volume resistance of the molding and multiplying the result by 100.

Still another method is based on the fact that a higher weld degree of metal particles in a composite metal molding results in a lower resistance thereof when the particles are of a soft magnetic material, and the weld ratio is determined by measuring the core loss of a bulk formed from the same metal as a composite metal molding and calculating the ratio of the core loss of the molding to the core loss of the bulk taken to be 100.

The value of the weld ratio R as herein adopted was obtained by the last method utilizing the ratio in core loss, though a similar value can be obtained by any other method. This method is the easiest of all when the core loss of the bulk of the same metal as the composite metal molding is known.

The smaller the value of the weld ratio, the lower mechanical strength the composite metal molding has, and the larger the value, the higher mechanical strength the molding has. However, the larger the value of the weld ratio, the lower dimensional accuracy the molding tends to have.

A second aspect of the present invention is concerned with a method for manufacturing a composite metal molding, including the step of coating metal particles containing a soft magnetic material with a resin to prepare a molding material, the step of molding the molding material under pressure into a predetermined shape to make a pressurized preform, and the step of heating the pressurized preform to calcine the resin and weld mutually the metal particles to make a composite metal molding containing the metal particles and the carbide of the resin intervening among the metal particles.

According to the method of the present invention, the method can manufacture a composite metal molding having substantially the same dimensions and shape as the pressurized preform, since the heating of the pressurized preform does not burn away the resin completely, but allows it to remain in the carbide among the metal particles. As the adjoining metal particles are partially welded together, the composite metal molding is high in dimensional accuracy and excellent in mechanical strength. It provides, among others, a molded magnetic element having good soft magnetic properties.

Although the timing for calcining the resin and the timing for welding the metal particles may differ from each other, they are preferably set at the same time to avoid any complication of the process. While the composite metal molding as manufactured can be used as a final molding, it can also be deburred, coated or treated for rust-proofing, if required.

According to the present invention, the heating of the pressurized preform does not burn away the resin completely, but forms it into carbide, and does not cause any such large dimensional change to the pressurized preform as is caused by the powder metallurgical sintering process. The pressurized preform is preferably heated in an atmosphere of vacuum, reduction or inert gas.

Referring to the proportions of the metal particles and resin in the molding material, a higher proportion of the resin to the metal particles makes it difficult to form a pressurized preform of high density and makes the metal particles difficult to weld together when the pressurized preform is heated, resulting in a composite metal molding of low mechanical strength. On the other hand, a lower proportion of the resin gives a pressurized preform of low strength which is easily broken, and allows the welding of the metal particles to proceed extremely when it is heated, resulting in a composite metal molding differing greatly in dimensions. Accordingly, the proportion of the resin containing additives, such as an acid catalyst, to the metal particles in the molding material is preferably in the range of 0.1 to 10 parts by mass to 100 parts by mass of metal particles when the resin is a furan resin. It is more preferably in the range of 0.3 to 5 parts by mass and most preferably in the range of 0.5 to 3 parts by mass.

The molding material consists mainly of the metal particles and resin. However, it preferably further contains 0.01 to 1 parts by mass of a solid lubricant selected from e.g. metallic soaps, higher fatty acids, talc, molybdenum disulfide and fluorocarbons to make a pressurized preform of high density and facilitate its removal from the mold. The addition of a solid lubricant in a large quantity is not desirable, since it usually lowers the mechanical strength of the pressurized preform. However, there is no particular limitation in the use of a solid lubricant which can reduce any friction force between the molding material and the mold and facilitate its movement in the mold to make a pressurized preform of high density and is easily removable from the pressurized preform by gasification when the pressurized preform is heated to make a composite metal molding. A preferred solid lubricant satisfying such requirements is a metallic soap and more preferably zinc stearate.

In the method for manufacturing the composite metal molding according to the second aspect of the present invention, the metal particles may contain Fe, Ni, Co and a soft magnetic material composed of a soft magnetic alloy consisting mainly of any such element or a mixture of such alloys. The step of heating the pressurized preform to make a composite metal molding preferably includes the step of annealing the soft magnetic material to remove its internal strain. This makes it possible to obtain a molded magnetic body having still better soft magnetic properties.

The pressurized preform is preferably heated at a temperature enabling the resin to be calcined without being burnt away and enabling the metal particles to be welded together in an adequate weld ratio. The temperature depends on the amount of the resin forming a part of the pressurized preform, the kind of metal particles employed, etc. When its heating temperature is low, it is generally the case that the removal of strain from the metal particles becomes insufficient, though the calcination of the resin brings about only a small dimensional change in the pressurized preform, or the composite metal molding. As a result, the metal particles fail to be welded mutually satisfactorily and make a molding of high mechanical strength and its soft magnetic properties are not improved when the metal particles are of a soft magnetic material.

On the contrary, a high heating temperature causes the resin to undergo excessive carbonization and eventually burn away, resulting in a composite metal molding which has undergone an excessively large dimensional change leading to an undesirable phenomenon, though a high weld ratio of metal particles may give a higher mechanical strength. Therefore, the step of heating the pressurized preform is effective to include heating the pressurized preform at a temperature in the range of 500° C. to 1,000° C. when the thermosetting resin is a furan resin. If its heating temperature exceeds 1,000° C., the molding is of lower dimensional accuracy, though higher in mechanical strength. If it is lower than 500° C., the metal particles fail to be relieved from strain effectively and welded together satisfactorily, resulting in a molding which is low in mechanical strength and fails to show good mechanical properties.

Although there is no particular limitation as to the resin which can be employed for the purpose of the present invention if it has a high force for bonding the metal particles without foaming or burning away when heated, a thermosetting resin is preferred and a furan resin is, among others, preferred, as stated before. The furan resin is a general name for the resins having furan rings, and it is possible to use a furfuryl alcohol-furfural co-condensation type, furfuryl alcohol type or furfural-phenol co-condensation type resin. Of course, it is also possible to use a furfural-ketone, furfuryl alcohol-urea, or furfuryl alcohol-phenol co-condensation type resin. It is preferable to use an organic or inorganic acid catalyst when curing the furan resin under heat. The amount of the acid catalyst added to the furan resin is preferably from 0.001 to 10 parts by mass for 100 parts by mass of furan resin to ensure the curing of the resin and avoid any effects that the catalyst may exert on the metal particles.

A third aspect of the present invention is concerned with an electromagnetic driving element including a permanent magnet and a yoke which formed a magnetic circuit upon energization to a field coil, wherein the yoke is the composite metal molding according to the first aspect of the present invention or the composite metal molding manufactured by the method according to the second aspect of the present invention.

It is possible to obtain an electromagnetic drive element for e.g. a light amounts control device, or a motor having steady magnetic properties by using the composite metal molding according to the present invention as a yoke for an electromagnetic drive element including a permanent magnet and the yoke forming a magnetic circuit upon energization to a field coil.

Further features of the present invention will become apparent from the following description of exemplary embodiments (with reference to the attached drawings).

DESCRIPTION OF THE EMBODIMENTS

Figure 1:
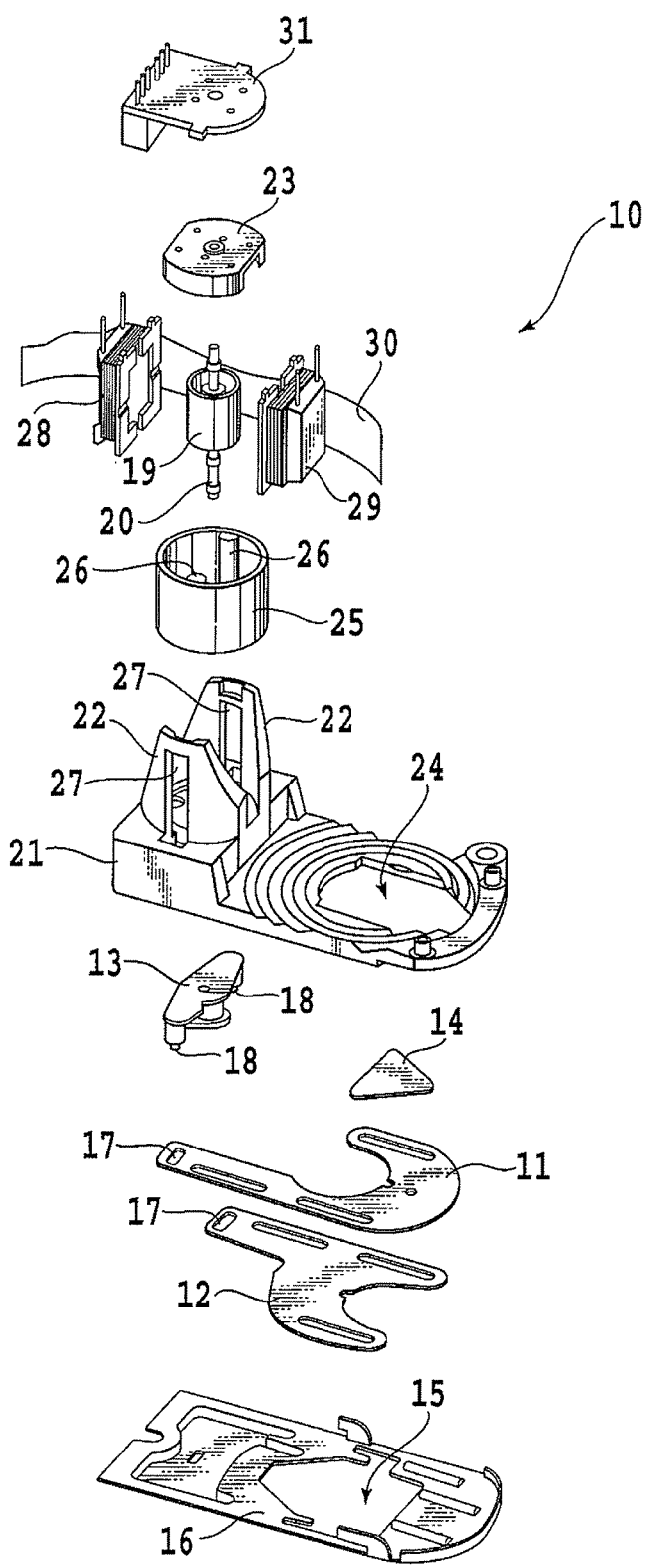
FIG. 1 is an exploded perspective view of a light amounts control device for an optical instrument according to an embodiment of the present invention.

An embodiment of the present invention in which it is applied to an electromagnetic drive element for a light amounts control device for an optical instrument will now be described in detail with reference to FIG. 1 showing an exploded perspective view thereof. It is, however, to be understood that the present invention is not limited to any such embodiment thereof, but will permit any variation or modification covered by the concept of the present invention as claimed in the claims and will naturally be applicable to any other art belonging to the spirit of the present invention.

The light control element 10 for an optical instrument which is shown in FIG. 1 has a pair of aperture diaphragms 11 and 12 comprising blades according to the present invention and supported movably in mutually opposite directions by the rotation of a link arm 13 to vary the opening of an aperture defined by the aperture diaphragms 11 and 12. An ND filter 14 is fixed to one of the aperture diaphragms 11 for preventing the passage of an excessive amount of light which cannot be controlled by the aperture. The aperture diaphragms 11 and 12 are supported reciprocally on a case 16 having an opening 15 for a path of light and have slots 17 formed at their base ends, respectively, and each connected with one of pins 18 formed at the opposite ends, respectively, of the link arm 13. A shaft 20 projects from a cylindrical rotor magnet 19 so magnetized as to have two poles along two halves, respectively, of its circumference and has one end joined integrally to the middle of the link arm 13. The rotor magnet 19 is attached to a bottom board 21 rotatably by a bearing embedded in the bottom board 21, but not shown. The rotor magnet 19 has another end supported rotatably by a bearing not shown on a cap member 23 fitted on the ends of a pair of brackets 22 projecting from the bottom board 21.

The bottom board 21 having an opening 24 formed for the path of light has a stopper portion projecting for abutting on the link arm 13 to define its limits of rotation, though not shown. A cylindrical yoke 25 surrounding the rotor magnet 19 in a spaced relation thereto has a pair of positioning protrusions 26 formed on its inner surface and each engaged in a fitting hole 27 formed in the corresponding one of the elastically deformable brackets 22 of the bottom board 21 to be thereby united with the corresponding bracket 22 of the bottom board 21. The yoke 25 is formed from a soft magnetic material and forms with the rotor magnet 19 a magnetic circuit, or a moving magnet according to the present invention. A driving coil 28 for driving the rotor magnet 19 and a damping coil 29 for generating a back electromotive force proportional to the rotating speed of the rotor magnet 19 to use it for controlling the rotation of the rotor magnet 19 are situated on the diametrically opposite side of the yoke 25 from each other. The driving and damping coils 28 and 29 are fixed to the yoke 25 with an adhesive tape 30 and connected to a printed circuit board 31 for receiving a signal from outside. The driving and damping coils 28 and 29 are so attached to the yoke 25 as to face each other in a direction perpendicular to that in which the positioning protrusions 26 of the yoke 25 face each other. The positioning protrusions 26 have also the function of setting the magnetically stable position of the detent torque of the rotor magnet 19. Therefore, it is possible to drive the aperture diaphragms 11 and 12 and hold the aperture in its closed position by attracting the rotor magnet 19 magnetically when the supply of an electric current to the driving coil 28 is interrupted.

The yoke 25 in the light amounts control element 10 is formed from a composite metal molding according to the present invention and a method for its manufacture will now be described by way of example.

An iron powder-based soft magnetic composite, Somaloy 500 (trade name of Höganäs AB, Sweden) was prepared as metal particles. A furan resin, VF303 (trade name of Hitachi Kasei Kogyo Co., Ltd.) was prepared as a resin, and A3 (trade name of Hitachi Kasei Kogyo Co., Ltd.) as an acid catalyst therefor. A mixture of 100 parts by mass of furan resin and 1 part by mass of acid catalyst was diluted with acetone, and its dilution adjusted in viscosity was sprinkled on floating iron particles to coat the iron particle surfaces with the furan resin containing the acid catalyst upon evaporation of the acetone used as the solvent to thereby produce a molding material. Zinc stearate, a common industrial reagent, was employed as a solid lubricant and 0.5 part by mass thereof was added uniformly to the molding material and the molding material was charged into a mold by one second of vibration with a frequency of 120 Hz and a vibrating force of 20 N by a piston vibrator. Then, a predetermined pressure was applied to the molding material in a direction parallel to the axis of the yoke 25 to make a pressurized preform.

The mold employed by the process under description had an inside diameter of 6.000 mm and its center pin had an outside diameter of 5.200 mm and had one or two semicircular grooves formed in its outer peripheral surface to form a positioning protrusion or protrusions 26.

The pressurized preform was released from the mold, placed on a flat ceramic plate and heated at 180° C. for an hour to have the furan resin cured. While a vacuum of $10^{-3}$ Pa was maintained, it was heated at 600° C. for an hour so that the furan resin might be decomposed and removed as unnecessary gas. Its heating temperature was raised from 850° C. to 1,000° C., held for an hour in a hydrogen reducing atmosphere for strain-relief annealing and cooled to ambient temperature to yield a yoke 25 as a composite metal molding.

The powder metallurgical sintering of an iron-based metal usually employs a temperature of 1,100° C. to 1,300° C. for welding metal particles together. A weld ratio of 80% or higher is usually achieved to give a sintered molding of high mechanical strength, but a large dimensional change occurs to an article having a small thickness like the molding of the process under description. When a plurality of articles are heat treated in contact with each other, their welding to each other occurs with the carbonization of the furan resin and the welding of the metal particles and brings about an extreme reduction in working efficiency.

No satisfactory welding or removal of internal strain can be achieved at any temperature below 500° C. A composite metal molding can be formed even by heating at 500° C., since the carbonization of a furan resin starts at about 350° C.

The present invention can form a yoke having desired properties by selecting a firing temperature realizing a weld ratio allowing a certain amount of carbide to remain among metal particles, while not forming any appreciably deformed molding, but forming a molding of high mechanical strength and magnetic properties.

The properties of the yokes 25 as produced are shown in Table 1 below. According to Example 1, a molding material was prepared by adding 1 part by mass of acid catalyst to 100 parts by mass of furan resin and adding 0.6 part by mass of their mixture to 100 parts by mass of iron powder and a pressure of 3.6 tons/cm$^2$ was applied thereto to make a pressurized preform. According to Example 2, a molding material was prepared by adding 4.0 parts by mass of the above mixture to 100 parts by mass of iron powder and a pressure of 3.6 tons/cm$^2$ was applied thereto to make a pressurized preform. According to Example 3, a molding material was prepared by adding 0.5 part by mass of the above mixture to 100 parts by mass of iron powder and a pressure of 10.0 tons/cm$^2$ was applied thereto to make a pressurized preform. According to Example 4, a molding material was prepared by adding 3.0 parts by mass of the above mixture to 100 parts by mass of iron powder and a pressure of 10.2 tons/cm$^2$ was applied thereto to make a pressurized preform. According to Example 5, a molding material was prepared by adding 1.0 part by mass of the above mixture to 100 parts by mass of iron powder and a pressure of 8.0 tons/cm$^2$ was applied thereto to make a pressurized preform.

In order to ascertain the advantages of the present invention, a pressurized preform according to Comparative Example 1 was made by employing a molding pressure of 3.2 tons/cm$^2$ in Example 1. Likewise, a pressurized preform according to Comparative Example 2 was made by employing a molding pressure of 3.4 tons/cm$^2$ in Example 2, and a pressurized preform according to Comparative Example 3 by employing a molding pressure of 15.6 tons/cm$^2$ in Example 3. According to Comparative Example 4, a molding pressure of 12.5 tons/cm$^2$ was employed for a molding material prepared by adding 5.0 parts by mass of the above mixture to 100 parts by mass of iron powder. According to Comparative Example 5, the following was made. A molding material was prepared by diluting 5 parts by weight of an elastomer, or a silicone resin, DY35-561A/B (trade name of Dow Corning Toray Co., Ltd.) with xylene and spraying its dilution on 100 parts by weight of iron powder as employed in Example 1. The molding material was molded with the same molding pressure as employed in Example 5 and the molding was heated at 200° C. for four hours to have the silicone resin cured. Then, it was heated at 600° C. for an hour, while a vacuum of $10^{-3}$ Pa was maintained, and it was held for an hour in a hydrogen reducing atmosphere at a temperature raised to 850° C. and was cooled to ambient temperature to give a yoke 25 according to Comparative Example 5 as a composite metal molding.

TABLE 1

|  | Residual carbon (%) | Weld ratio (%) | Dimensional change | Radial crushing strength | Magnetic properties |
|---|---|---|---|---|---|
| Example 1 | 0.0010 | 10 | ○ | ○ | ○ |
| Example 2 | 1.9800 | 10 | ○ | ○ | ○ |
| Example 3 | 0.0012 | 80 | ○ | ○ | ○ |
| Example 4 | 1.9900 | 50 | ○ | ○ | ○ |
| Example 5 | 0.0550 | 65 | ○ | ○ | ○ |
| Comparative Example 1 | 0.0008 | 9 | ○ | X | X |
| Comparative Example 2 | 2.0100 | 9 | X | X | X |
| Comparative Example 3 | 0.0008 | 85 | X | ○ | X |
| Comparative Example 4 | 2.0200 | 52 | X | ○ | X |
| Comparative Example 5 | — | 4 | X | X | X |

The amount of residual carbon was determined by determining its ratio to the metal element by infrared absorption spectroscopy after combustion. The weld ratio was determined by putting a winding on the yoke, applying a magnetic field of 796 A/m to the yoke to determine its core loss at a frequency of 1 kHz and calculating its ratio to the core loss of a yoke having the same shape as that of the corresponding Example, but formed from a bulk of pure iron when the latter was 100.

Every molding was graded as ○ in dimensional change when the absolute value of an error in the outside diameter of the yoke 25 as compared with the inside diameter of the mold and the absolute value of an error in the inside diameter of the yoke 25 as compared with the outside diameter of the center pin in the mold were both smaller than 0.5%, and as X when they were not. When the absolute values of such errors are smaller than 0.5%, the yoke 25 does not require any dimensional correction.

The radial crushing strength was determined by employing the compression mode of a material testing machine in accordance with the method specified by JIS Z2507. Every molding was graded as X when its radial crushing strength was lower than 100 N/mm$^2$, and as ○ when its radial crushing strength was equal to, or higher than 100 N/mm$^2$, since any article having a small wall thickness like each yoke 25 according to the embodiment under description had a sharply increasing tendency to crack or break when its radial crushing strength was lower than 100 N/mm$^2$.

The yokes 25 according to Examples 1 to 5 and Comparative Examples 1 to 5 were each evaluated for magnetic properties by incorporating the yoke in the light control device 10 as shown in FIG. 1 and checking the operation of the aperture diaphragms 11 and 12 by interrupting the supply of an electric current. Every yoke was graded as ○ when the aperture diaphragms 11 and 12 closed the aperture smoothly, and as X when they did not close the aperture smoothly, or at all.

The results shown in Table 1 confirm the high dimensional accuracy and strength of each of the yokes 25 according to Examples 1 to 5 of the present invention as the soft magnetic member of the optical control device 10.

The yokes 25 according to Example 5 and Comparative Example 5 were examined for their magnetic flux density in a very weak magnetic field having an intensity of 796 A/m by putting 30 turns of primary and secondary windings thereon and employing a direct-current magnetization automatic recording apparatus. The yoke 25 according to Example 5 showed a magnetic flux density of 1.05 T, while the yoke according to Comparative Example 5 showed a magnetic flux density of 0.23 T. These results confirmed that the yoke 25 according to the present invention was an excellent soft magnetic material having a very high magnetic flux density in a very weak magnetic field.

On the contrary, the molding of Comparative Example 1 did not show any satisfactorily high radial crushing strength, as its residual carbon content and weld ratio were both low, nor was it satisfactory in magnetic properties, either, though it was satisfactory in dimensional accuracy owing to its low weld ratio despite its residual carbon content lower than 0.001%. The molding of Comparative Example 2 having a residual carbon content higher than 2% showed an undesirably large dimensional change due to a large amount of carbonized resin and gas gathering in the molding. As its residual carbon content and weld ratio were both low, it did not show any satisfactorily high radial crushing strength, nor was it satisfactory in magnetic properties, either. The molding of Comparative Example 3 was undesirably low in dimensional accuracy due to its weld ratio over 80% and its dimensional error was apparently responsible for the failure of the aperture diaphragms to work smoothly. The molding of Comparative Example 4 having a residual carbon content higher than 2% showed an undesirably big dimensional error due to a large amount of carbonized resin and gas gathering in the molding and it was apparently responsible for the failure of the aperture diaphragms to work smoothly.

Figure 2:
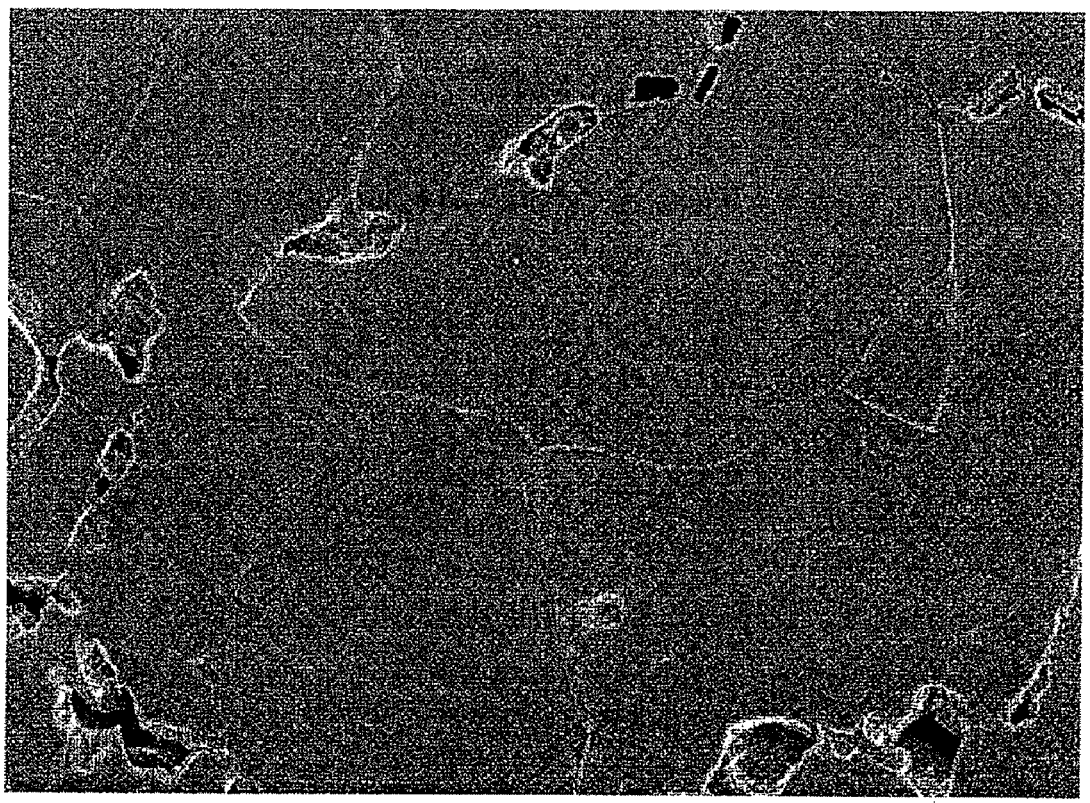
FIG. 2 is a scanning electron micrograph showing in an enlarged way the internal structure of a yoke manufactured by the method according to the present invention and shown in FIG. 1.
Figure 3:
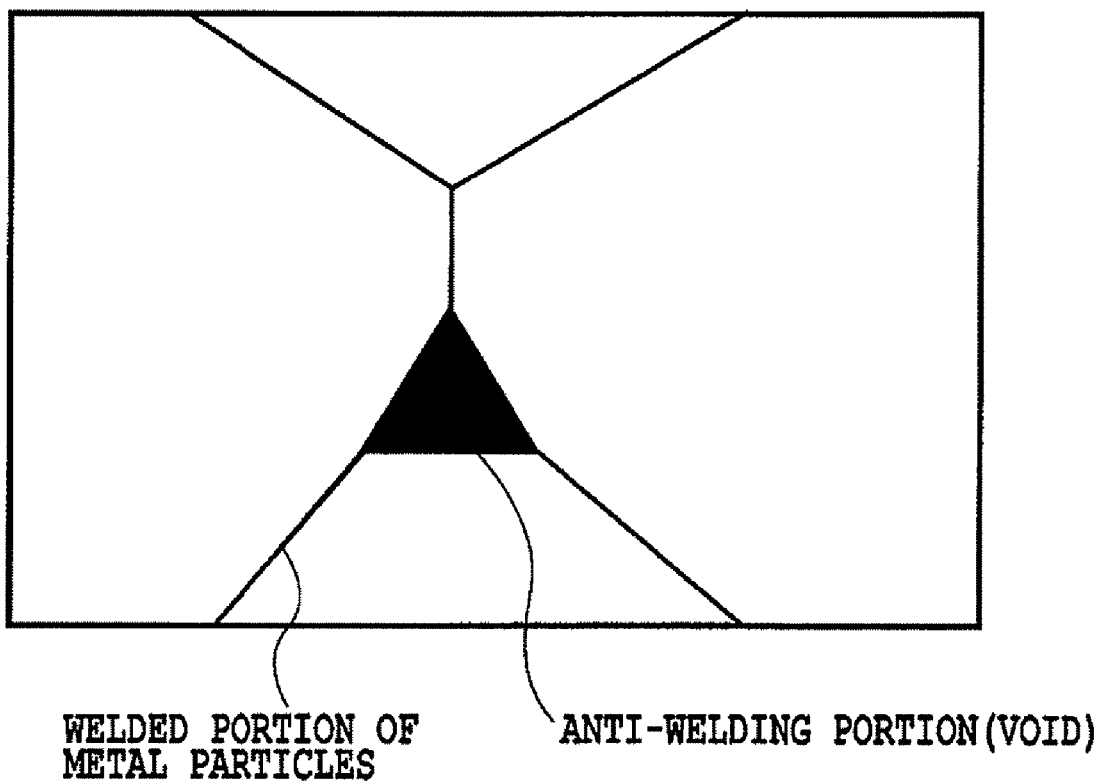
FIG. 3 is a schematic diagram showing in a typical pattern the internal structure of the yoke shown in FIG. 2.
Figure 4:
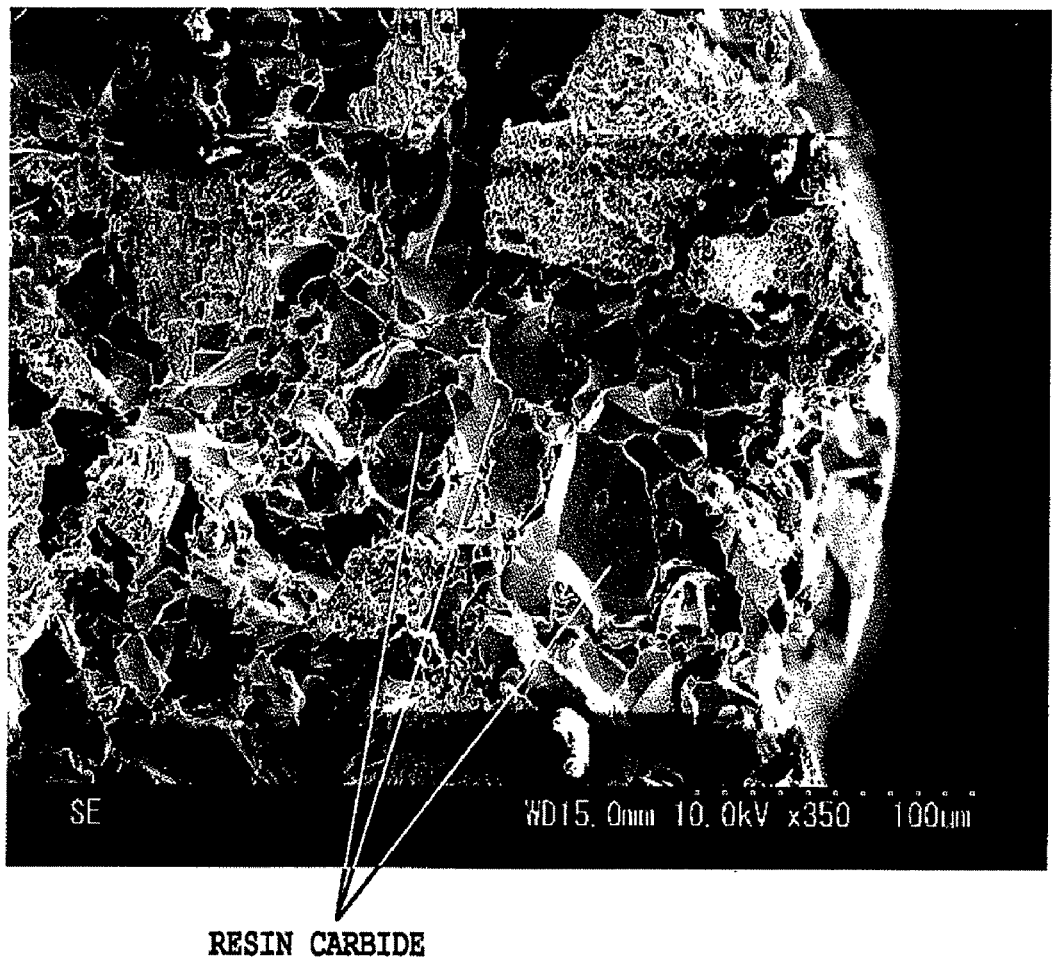
FIG. 4 is a scanning electron micrograph of a positioning protrusion on the yoke manufactured by the method according to the present invention and shown in FIG. 1.

The yoke 25 according to Example 5 was cut and had its cut surface polished smoothly and examined through a microscope. The result is shown in FIG. 2. FIG. 2 reveals metal particles welded together and voids among particles not welded together. FIG. 3 is a typical representation of the structure shown in FIG. 2. Carbide remains on the surfaces of the voids shown in FIGS. 2 and 3 and restrains the welding together of iron particles. FIG. 4 is a scanning electron micrograph taken after etching away iron particles with dilute nitric acid and revealing the carbide of the furan resin having a flat surface not eroded with the etching solution.

Thus, the control of the residual carbon content of the composite metal molding in which the resin is calcined under heat and stays in carbide form makes it possible to manufacture a composite metal molding of high strength even with a low weld ratio and of high accuracy by retaining its stability in shape and without causing any appreciable dimensional change. Moreover, the welding together of metal particles under heat imparts a very high level of mechanical strength to the molding. When the metal particles are of a soft magnetic material, the removal of internal strain from the material under heat improves its soft magnetic properties remarkably.

Figure 5:
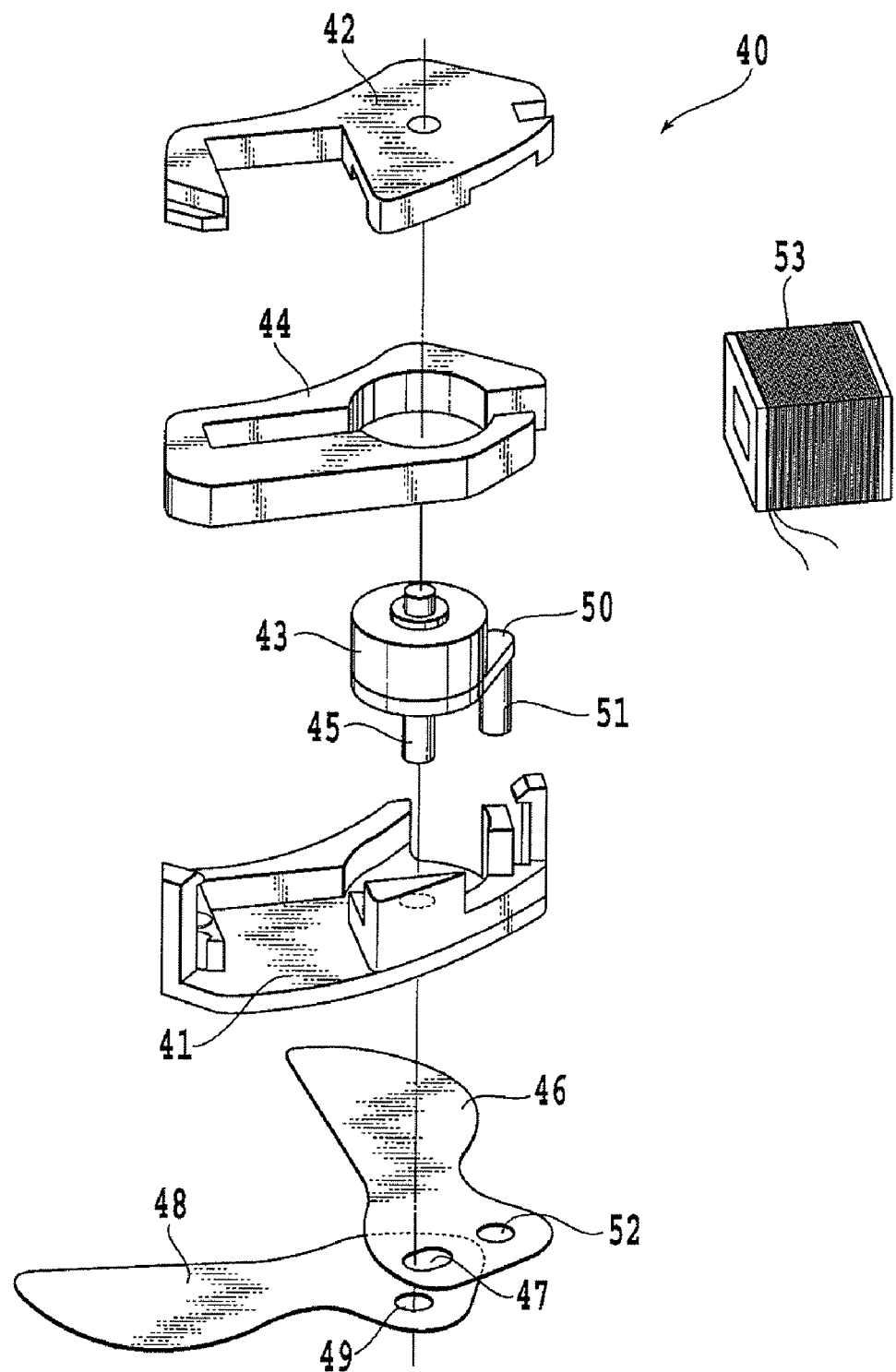
FIG. 5 is an exploded perspective view of a shutter element for a camera according to another embodiment of the present invention.

Another form of embodiment of the present invention in which a composite metal molding is employed as a shutter device for a camera will now be described in detail with reference to FIG. 5 showing an exploded perspective view thereof. The shutter device 40 is of the so-called lens shutter and is held in a very narrow space in a lens barrel not shown.

A magnet rotor 43 formed from a cylindrical permanent magnet is held between a casing 41 for the shutter device 40 and an upper cover 42 put on the casing 41. A yoke 44 surrounding the magnet rotor 43 in a spaced relation thereto and forming therewith a moving magnet according to the present invention is held between the casing 41 and the upper cover 42, too. The magnet rotor 43 is so magnetized as to have two poles along two halves, respectively, of its circumference. The magnet rotor 43 has a rotary shaft 45 extending at one end through the casing 41 and through a slot 47 formed in a first shutter blade 46 at the base end thereof and fitted integrally in a connecting hole 49 formed in a second shutter blade 48 at the base end thereof. A swinging arm 50 fitted integrally about one end portion of the rotary shaft 45 of the magnet rotor 43 has a driving pin 51 protruding from its distal end and fitted integrally in a connecting hole 52 formed in the first shutter blade 46 beside its slot 47. Thus, the rotation of the magnet rotor 43 with its rotary shaft 45 causes the second shutter blades 48 to rotate simultaneously, while there is a certain lag of time before the rotation of the first shutter blade 46. The rotary shaft 45 of the magnet rotor 43 has another end supported rotatably by the upper cover 42.

The yoke 44 shaped substantially like a tuning fork is formed from a soft magnetic material and equipped with a winding 53 connected to a power source not shown. The control of the magnitude and direction of an electric current supplied to the winding 53 makes it possible to select the operation of the shutter blades 46 and 48 as desired. That portion of the fork-shaped yoke 44 which faces the magnet rotor 43 is so shaped that the magnet rotor 43 may be rotated in a direction closing the shutter blades 46 and 48 completely when the supply of an electric current to the winding 53 is interrupted. As another function of the shutter, it is necessary for the shutter blades not to open upon receiving any impact or the like, either, and that portion of the yoke which faces the magnet rotor is particularly required to be dimensionally reliable. This point differentiates the yoke 44 from the substantially cylindrical yoke 25 as described before.

In order to obtain the stable performance of the shutter device 40, it is important to ensure the flatness of the yoke 44 forming the opposed magnetic pole of the magnet rotor 43 and the dimensional accuracy of the clearance between the magnet rotor 43 and the yoke 44.

Therefore, an attempt was made to manufacture a yoke 44 by the process according to the present invention. A pressurized preform was formed by employing a mold corresponding in shape to a yoke 44, the same molding material as in Example 5 and a molding pressure of 9.0 tons/cm². The amount of the molding material and the degree to which the upper and lower punches of the mold were forced against the molding material were so controlled that the molded yoke might have a diameter in its portion forming the opposed magnetic pole of the magnet rotor 43, 4,000 mm and a thickness of 2.00 mm as released from the mold.

The pressurized preform was heated at 180° C. to have its furan resin cured and then under the same conditions as in Examples 1 to 5 to yield a yoke according to Example 6 of the present invention as a composite metal molding shaped substantially like a tuning fork.

According to Comparative Example 6, a flat sheet of pure iron having a thickness of 1.00 mm was pressed into the shape of a yoke 44 and heat treated at 850° C. for an hour in a hydrogen atmosphere to make a pressed yoke.

According to Comparative Example 7, a sintering material was prepared by adding 1.5 parts by weight of a polyamide resin as a binder to 100 parts by weight of an iron powder mentioned as Somaloy 500 before. It was placed in the same mold as had been employed in Example 6, and subjected to a molding pressure of 9.0 tons/cm², and the amount of the sintering material and the degree to which the upper and lower punches of the mold were forced against the sintering material were so controlled that the molding might have a thickness of 2.00 mm as released from the mold. The molding was placed in a furnace held at 220° C. in an ambient atmosphere to have the polyamide resin degreased and was, then, subjected to one hour of sintering treatment at 1,100° C. in a hydrogen atmosphere to make a sintered yoke.

(Evaluation for Dimensional Accuracy)

Ten yokes were prepared according to each of Example 6 and Comparative Examples 6 and 7 and the average of the diameters of their portions forming the opposed magnetic pole of magnet rotors 43 and the standard deviation thereof were determined for comparing them in dimensional accuracy. In Comparative Example 6, however, the measurements were made of only a single molding. The flatness of each yoke was calculated by placing it on a base, measuring the maximum clearance therebetween, dividing it by the thickness of the yoke and multiplying the result by 100 to express it in percentage. The value is the average of the ten yokes. The results are shown in Table 2.

TABLE 2

|  | Average diameter (mm) | Standard deviation (mm) | Flatness (%) |
| --- | --- | --- | --- |
| Example 6 | 3.998 | 0.006 | 0.25 |
| Comparative Example 6 | 4.005 | 0.036 | 6.20 |
| Comparative Example 7 | 3.922 | 0.056 | 2.13 |

As is obvious from Table 2, the Example of the present invention shows that it can make even for a fork-shaped member a composite metal molding having only a very small degree of gap deformation at its end, a very high level of flatness and so high a level of dimensional accuracy that its dimensions are very close to those of the mold. The molding of Comparative Example 6 apparently had a great deal of uneven strain produced by the pressing of pure iron and had its flatness lowered by heat treatment. The molding of Comparative Example 7 apparently had its flatness lowered by the metal particles having a weld ratio of 80% or higher as a result of heat treatment at 1,100° C.

(Evaluation for Shutter Performance)

A shutter device 40 made by putting a winding 53 on the yoke 44 according to Example 6 of the present invention as shown in FIG. 5 was put in a lens barrel not shown. A dropping impact test was conducted on the shutter device 40 by keeping the shutter blades 46 and 48 closed by the attractive force of the magnet rotor 43 formed from a permanent magnet and the yoke 44 without supplying any driving current to the winding 53, and by dropping the lens barrel from a height of 2.0 m. As regards the performance required of the shutter device 40, the shutter blades 46 and 48 are required to remain closed not only when no electric current is supplied, but also even after a given impact is applied to any optical instrument containing it. In all of the shutter devices 40 containing the yokes according to the Example of the present invention and the Comparative Examples, the shutter blades 46 and 48 were found to remain close when no electric current was supplied. As regards the results of the dropping impact tests, the shutter blades 46 and 48 were found to remain closed in the device containing the yoke according to the present invention, but were found to open sometimes due to a weak holding force in the devices containing the yokes according to the Comparative Examples.

(Material Strength Test)

A load was applied to each of the yokes according to Example 6 of the present invention and Comparative Examples 6 and 7 in the direction narrowing its substantially channel-shaped end opening to determine its buckling strength. As regards the pressed yoke according to Comparative Example 6, the test was conducted on two yokes laid one on the other. All of the yokes according to the present invention and the Comparative Examples showed substantially the same buckling strength that was sufficiently high to withstand normal handling.

While the foregoing description has been of the case in which an iron powder is used as a soft magnetic material, the present invention also enables the manufacture of a composite metal molding of high dimensional stability and mechanical strength by using any other soft magnetic material, or any other appropriate metallic material, with a resin.

Figure 6:
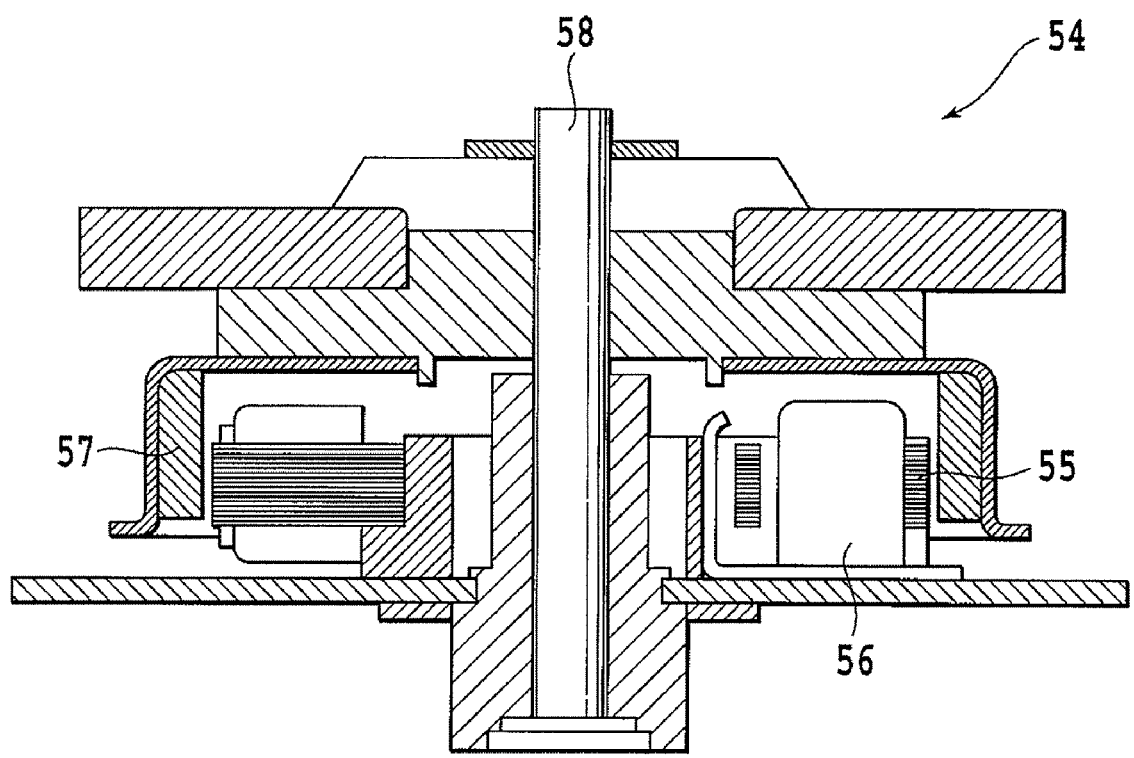
FIG. 6 is a sectional view of a spindle motor according to still another embodiment of the present invention.
Figure 7:
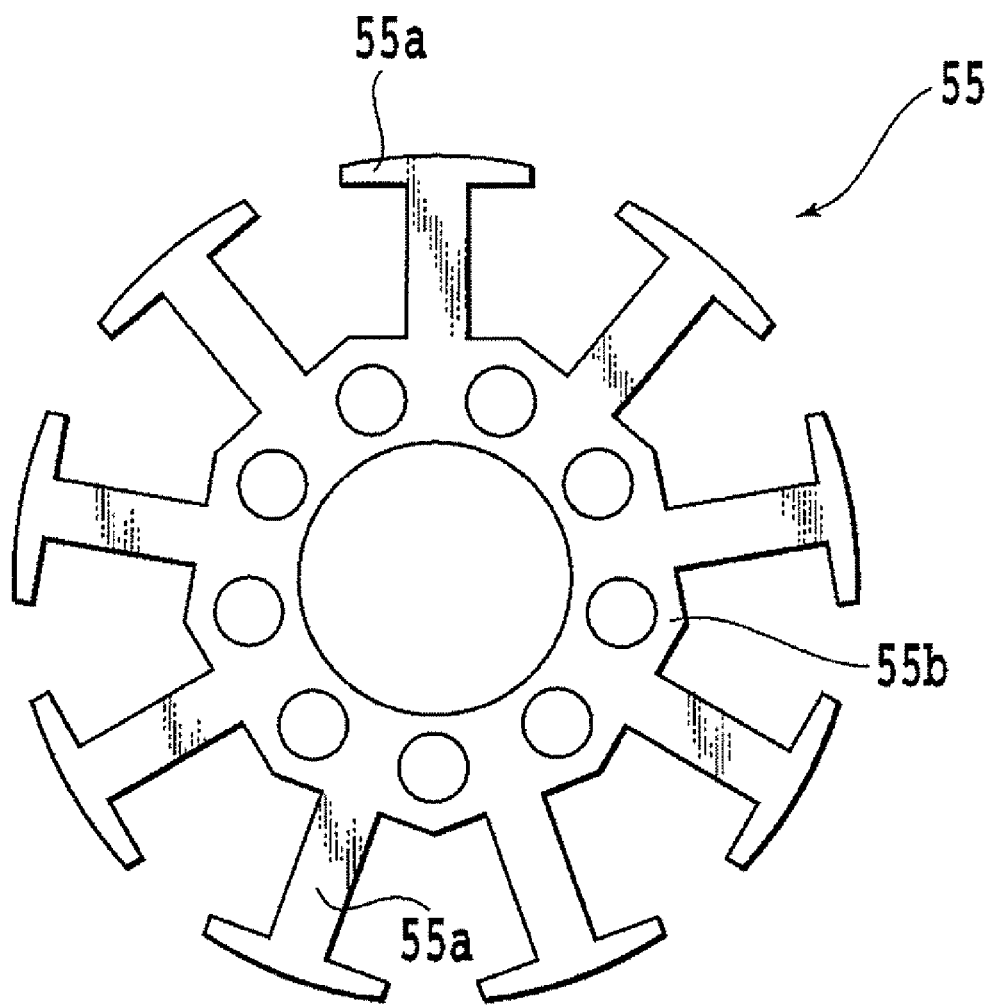
FIG. 7 is a top plan view of the yoke portion of the spindle motor shown in FIG. 6.

The molding according to the present invention can be employed not only as a yoke for an electromagnetic driving device for a light control device as described above, but also as a yoke for any other electromagnetic driving device, such as any of various kinds of motors. For example, the present invention is applicable to a yoke 55 having a plurality of radially extending coil holders 55a as shown in FIG. 7 which is used for a spindle motor 54 as shown in FIG. 6 which is used for e.g. a printer. The coil holders 55a of the yoke 55 hold a coil 56 wound thereon and an annular permanent magnet 57 surrounds the yoke 55 and is rotatable with a spindle 58. The coil holders 55a extending radially from the cylindrical main body 55b of the yoke 55 are of improved flatness and ensure a good accuracy of rotation as in the case of Example 6.

Figure 8:
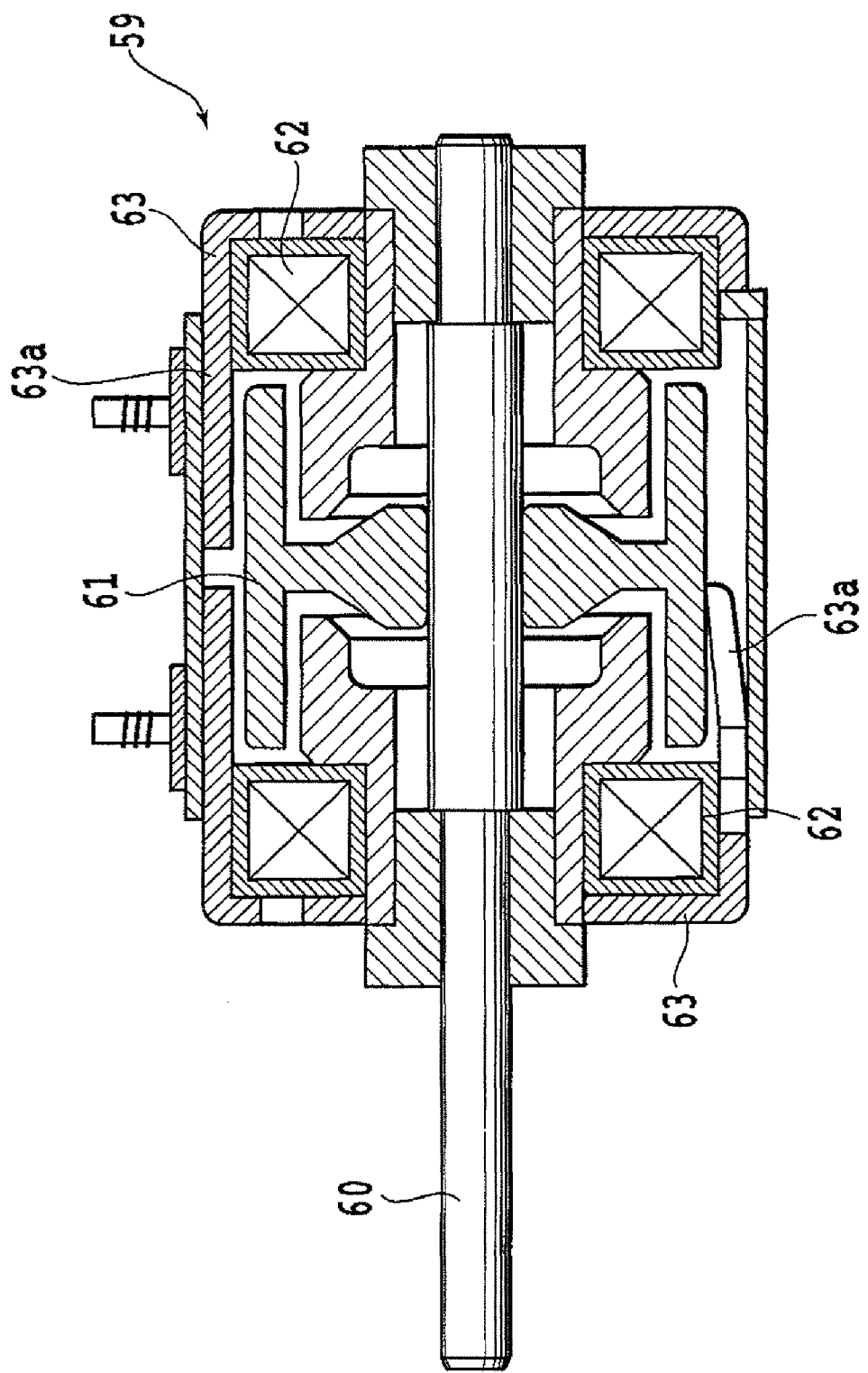
FIG. 8 is a sectional view of a cylindrical stepping motor according to still another embodiment of the present invention.
Figure 9:
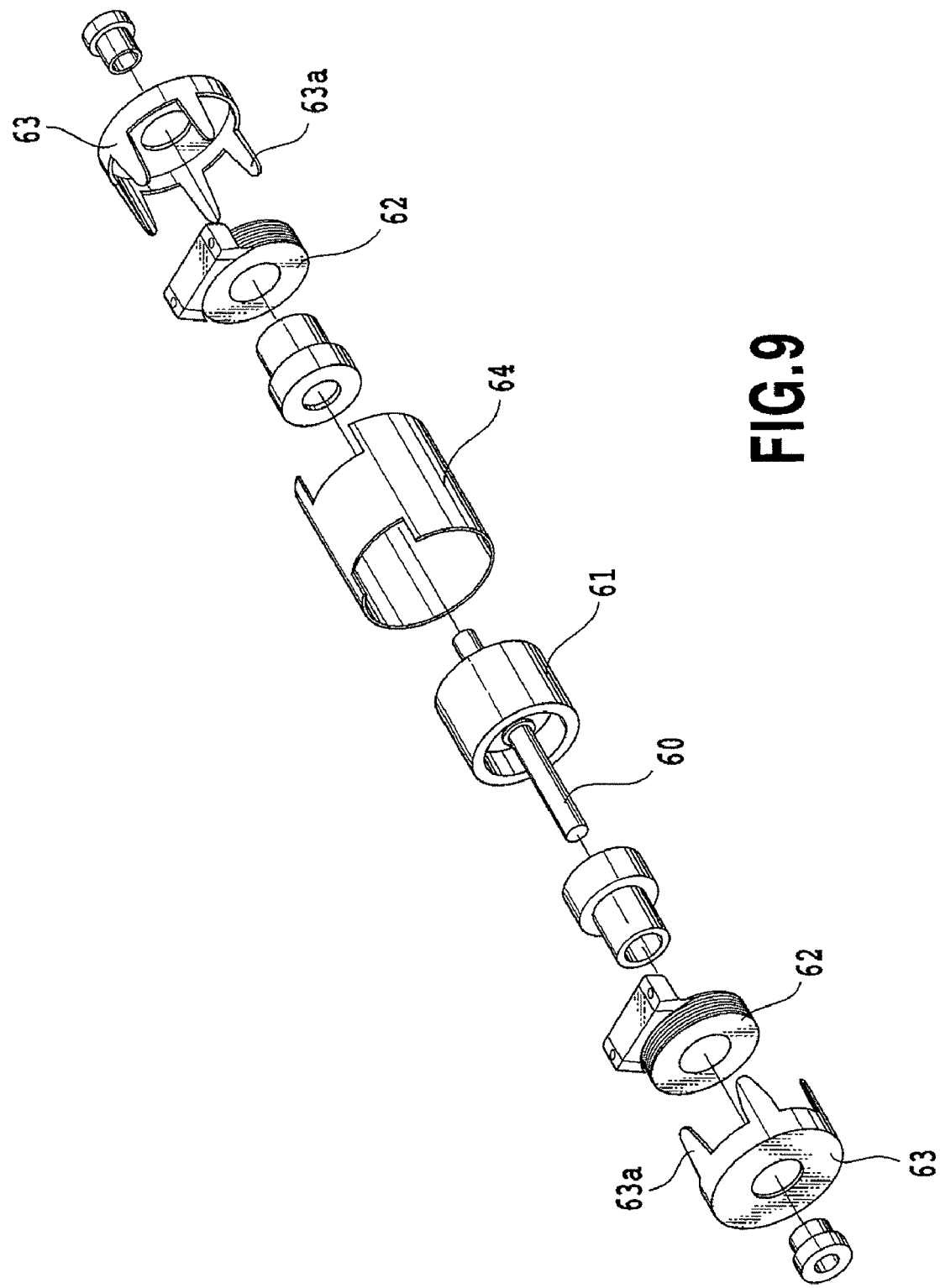
FIG. 9 is an exploded perspective view of the cylindrical stepping motor shown in FIG. 8.
Figure 10:
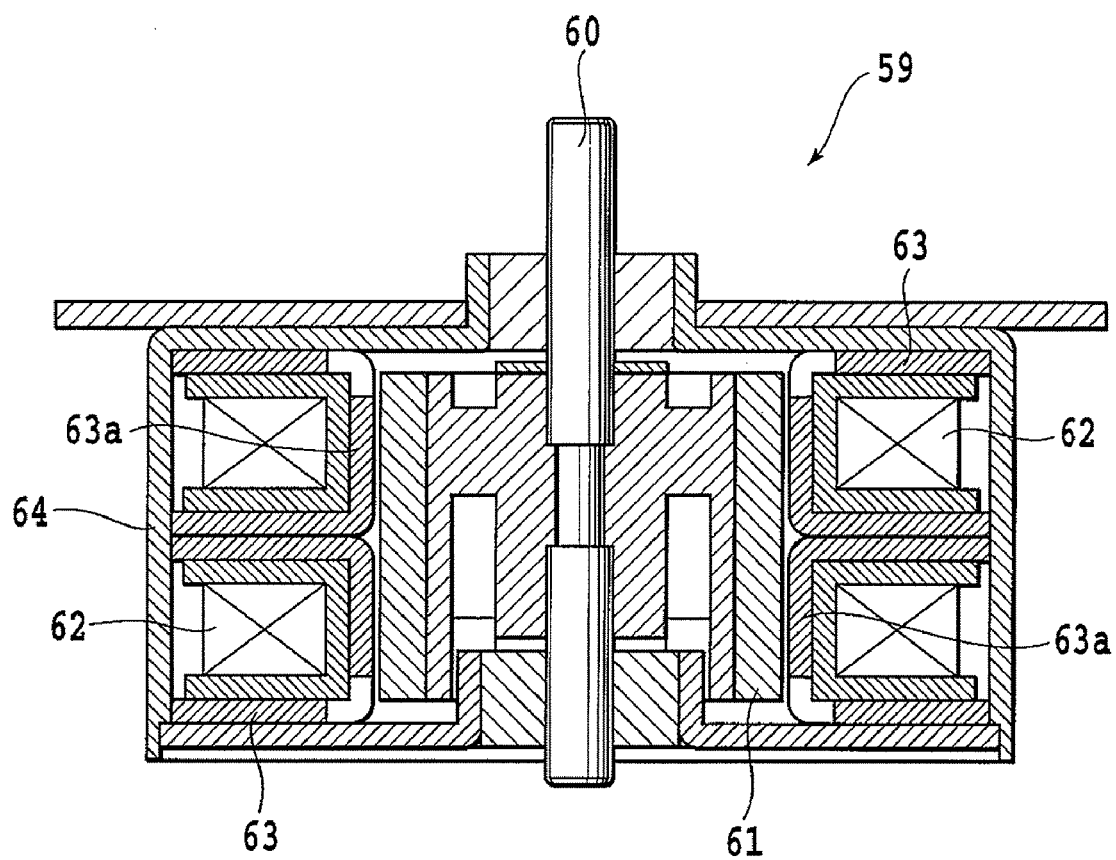
FIG. 10 is a sectional view of a different cylindrical stepping motor according to still another embodiment of the present invention.
Figure 11:
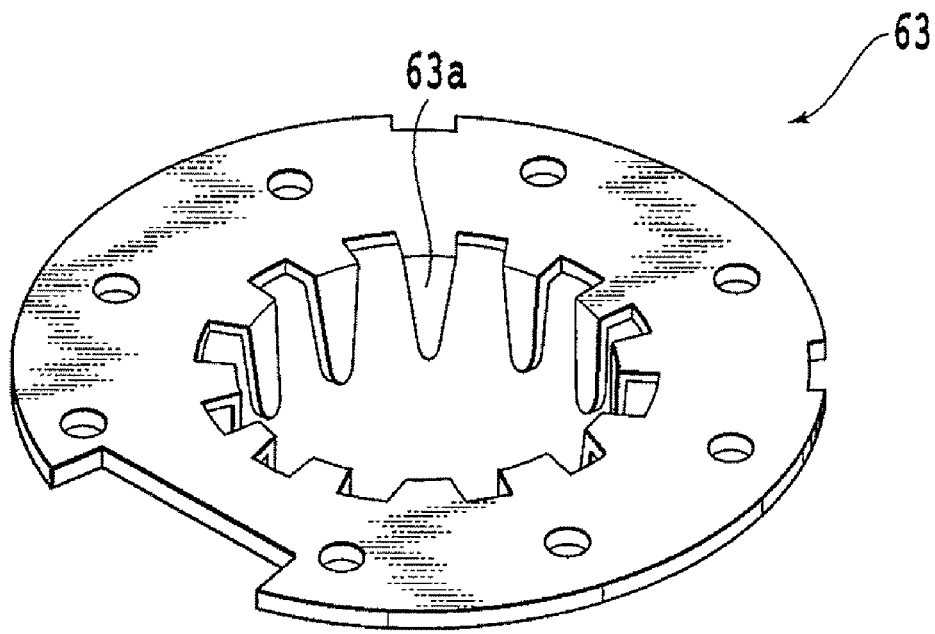
FIG. 11 is a perspective view of the yoke portion of the cylindrical stepping motor shown in FIG. 10.
Figure 11:
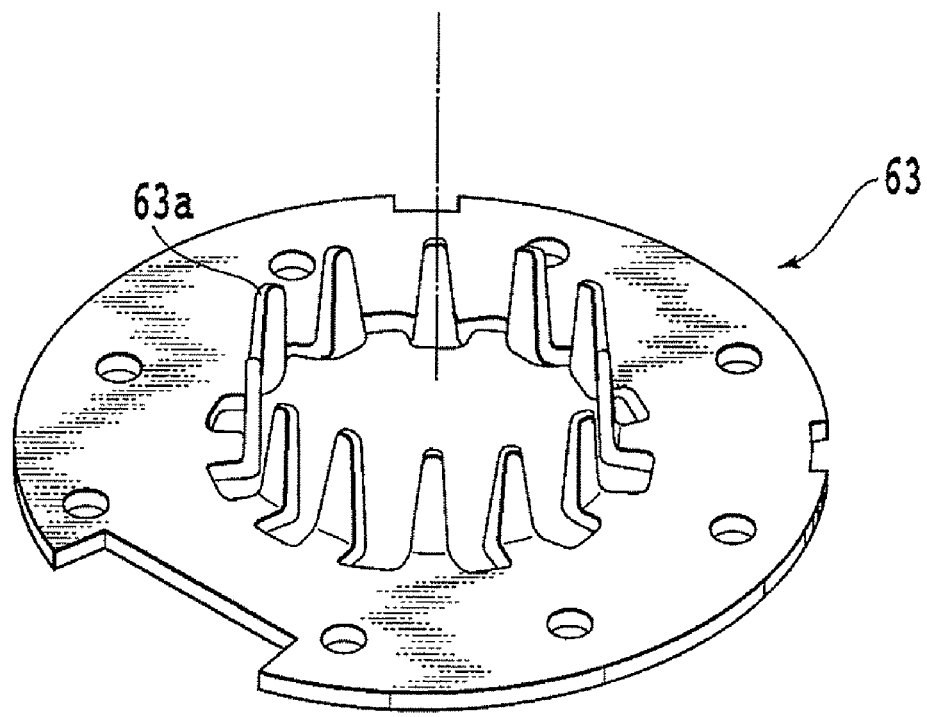

FIGS. 8 and 10 show stepping motors 59 each having a permanent magnet 61 fixed integrally to a spindle 60 and a pair of stators 63 each holding a coil 62 and fitted in a sleeve 64. The stators 63 have a high level of dimensional accuracy which cannot be achieved by e.g. ordinary press forming, since they are members of small wall thickness similar in shape to the moldings of Examples 1 to 5 and having an annular array of saw-toothed projections 63a as shown in FIGS. 9 and 11. Accordingly, the stepping motors 59 are excellent in stepping accuracy and torque characteristics.

Thus, the present invention provides as a composite metal molding any of asymmetric or thin-walled articles of high dimensional accuracy and strength including motor stators, transformers and magnetic head cores.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-296480, filed Oct. 11, 2005, and 2006-259246, filed Sep. 25, 2006, which are hereby incorporated by reference herein in their entirety.

What is claimed is:

1. A composite metal molding including metal particles which welded mutually and the carbide of a resin intervening among the metal particles, the metal particles containing a soft magnetic material, wherein the carbide of the resin has a weight ratio in the range of 0.001 to 2% to the metal particles when the metal particles have their proportion expressed as 100, and wherein the metal particles have a weld ratio of 10 to 80%.

2. A molding as claimed in claim 1, wherein the resin is a furan resin.

3. An electromagnetic driving element comprising a permanent magnet and a yoke which formed a magnetic circuit upon energization to a field coil, wherein the yoke is a composite metal molding as claimed in claim 1.

* * * * *